United States Patent
Vargantwar et al.

(10) Patent No.: US 8,140,072 B1
(45) Date of Patent: Mar. 20, 2012

(54) BORDER ZONE PAGING IN WIRELESS COMMUNICATION NETWORKS

(75) Inventors: Sachin R. Vargantwar, Overland Park, KS (US); Deveshkumar Narendrapratap Rai, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 475 days.

(21) Appl. No.: 12/417,002

(22) Filed: Apr. 2, 2009

(51) Int. Cl.
*H04W 4/00* (2009.01)

(52) U.S. Cl. ............... 455/435.2; 455/435.1; 455/458; 455/422.1

(58) Field of Classification Search ............ 455/458, 455/422.1, 403, 459, 460, 435.2, 435.1
See application file for complete search history.

(56) References Cited

U.S. PATENT DOCUMENTS

| | | | |
|---|---|---|---|
| 2004/0254980 A1* | 12/2004 | Motegi et al. | 709/203 |
| 2005/0048982 A1 | 3/2005 | Roland et al. | |
| 2006/0198344 A1* | 9/2006 | Teague et al. | 370/337 |
| 2007/0010294 A1* | 1/2007 | Shinoda et al. | 455/569.2 |

* cited by examiner

*Primary Examiner* — Kent Chang
*Assistant Examiner* — Ronald Eisner

(57) ABSTRACT

What is disclosed is a method of operating a wireless communication system that serves mobile communication devices. The method includes, in a first plurality of wireless access nodes, broadcasting a first paging zone identifier (ID), wherein the mobile communication devices report the first paging zone ID to a page control system when registering to use one of the first plurality of wireless access nodes. The method also includes, in a second plurality of wireless access nodes, broadcasting a second paging zone identifier (ID), wherein the mobile communication devices report the second paging zone ID to the page control system when registering to use one of the second plurality of wireless access nodes. The method also includes, in a third plurality of wireless access nodes, broadcasting the first paging zone ID and the second paging zone ID, wherein the mobile communication devices do not report to the to the page control system when registering to use one of the third plurality of wireless access nodes if currently using either the first paging zone ID or the second paging zone ID. The method also includes, in the page control system, transferring a first set of pages to the first plurality of wireless access nodes and third plurality of wireless access nodes for delivery to the mobile communication devices reporting the first paging zone ID, and transferring a second set of pages to the second plurality of wireless access and third plurality of wireless access nodes for delivery to the mobile devices reporting the second paging zone ID.

20 Claims, 4 Drawing Sheets

US 8,140,072 B1

BORDER ZONE PAGING IN WIRELESS COMMUNICATION NETWORKS

TECHNICAL FIELD

Aspects of the disclosure are related to the field of communications, and in particular, paging in wireless communication networks.

TECHNICAL BACKGROUND

Wireless communication networks typically include multiple wireless access nodes spread over a geographic area through which wireless communication devices can register and receive wireless communication services. In many examples, the wireless communication devices are mobile, and can move between wireless coverage areas of the wireless access nodes. The wireless communication devices typically provide information to the wireless communication network when registering with a wireless access node. This information could include which wireless access node through which the wireless communication device has registered.

The wireless communication network also typically transfers information to the wireless communication devices to indicate incoming calls, messages, or other alerts. This information, many times referred to as pages, must be routed through the wireless access nodes to reach the wireless communication devices.

However, when the wireless communication devices are mobile, the wireless communication devices may move quickly between wireless access nodes, causing difficulty in delivery of the pages as well as an increase in registration traffic between the wireless communication devices and the wireless communication network.

Overview

What is disclosed is a method of operating a wireless communication system that serves mobile communication devices. The method includes, in a first plurality of wireless access nodes, broadcasting a first paging zone identifier (ID), wherein the mobile communication devices report the first paging zone ID to a page control system when registering to use one of the first plurality of wireless access nodes. The method also includes, in a second plurality of wireless access nodes, broadcasting a second paging zone identifier (ID), wherein the mobile communication devices report the second paging zone ID to the page control system when registering to use one of the second plurality of wireless access nodes. The method also includes, in a third plurality of wireless access nodes, broadcasting the first paging zone ID and the second paging zone ID, wherein the mobile communication devices do not report to the to the page control system when registering to use one of the third plurality of wireless access nodes if currently using either the first paging zone ID or the second paging zone ID. The method also includes, in the page control system, transferring a first set of pages to the first plurality of wireless access nodes and third plurality of wireless access nodes for delivery to the mobile communication devices reporting the first paging zone ID, and transferring a second set of pages to the second plurality of wireless access and third plurality of wireless access nodes for delivery to the mobile devices reporting the second paging zone ID.

What is also disclosed is a method of operating a wireless communication system, wherein a page control system is configured to route pages to wireless access nodes for delivery to wireless communication devices, and wherein the wireless access nodes are partitioned into zones of wireless coverage. The method includes, in a first wireless access node situated in a first zone of wireless coverage, transferring a first zone assignment to wireless communication devices registering for wireless communication service with the first wireless access node, wherein the first zone assignment indicates the first zone of wireless coverage. The method also includes, in a second wireless access node situated in a second zone of wireless coverage, transferring a second zone assignment to wireless communication devices registering for wireless communication service with the second wireless access node, wherein the second zone assignment indicates the second zone of wireless coverage. The method also includes, in a third wireless access node situated in the first zone of wireless coverage, transferring a third zone assignment to wireless communication devices registering for wireless communication service with the third wireless access node, wherein the third zone assignment indicates both the first zone of wireless coverage and the second zone of wireless coverage. The method also includes, in the page control system, receiving a present zone assignment from a first of the wireless communication devices, wherein the present zone assignment indicates the first zone when the first of the wireless communication devices is initially registered for wireless communication service with the first wireless access node and subsequently registers for wireless communication service with the third wireless access node.

What is also disclosed is a wireless communication system wherein a page control system is configured to route pages to wireless access nodes for delivery to wireless communication devices, and wherein the wireless access nodes are partitioned into zones of wireless coverage. The wireless communication system includes a first wireless access node situated in a first zone of wireless coverage configured to transfer a first zone assignment to the wireless communication devices registering for wireless communication service with the first wireless access node, wherein the first zone assignment indicates the first zone of wireless coverage. The wireless communication system also includes a second wireless access node situated in a second zone of wireless coverage configured to transfer a second zone assignment to wireless communication devices registering for wireless communication service with the second wireless access node, wherein the second zone assignment indicates the second zone of wireless coverage. The wireless communication system also includes a third wireless access node situated in the first zone of wireless coverage configured to transfer a third zone assignment to wireless communication devices registering for wireless communication service with the third wireless access node, wherein the third zone assignment indicates both the first zone of wireless coverage and the second zone of wireless coverage. The wireless communication system also includes where the page control system in configured to receive a present zone assignment from a first of the wireless communication devices, wherein the present zone assignment indicates the first zone when the first of the wireless communication devices is initially registered for wireless communication service with the first wireless access node and subsequently registers for wireless communication service with the third wireless access node.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
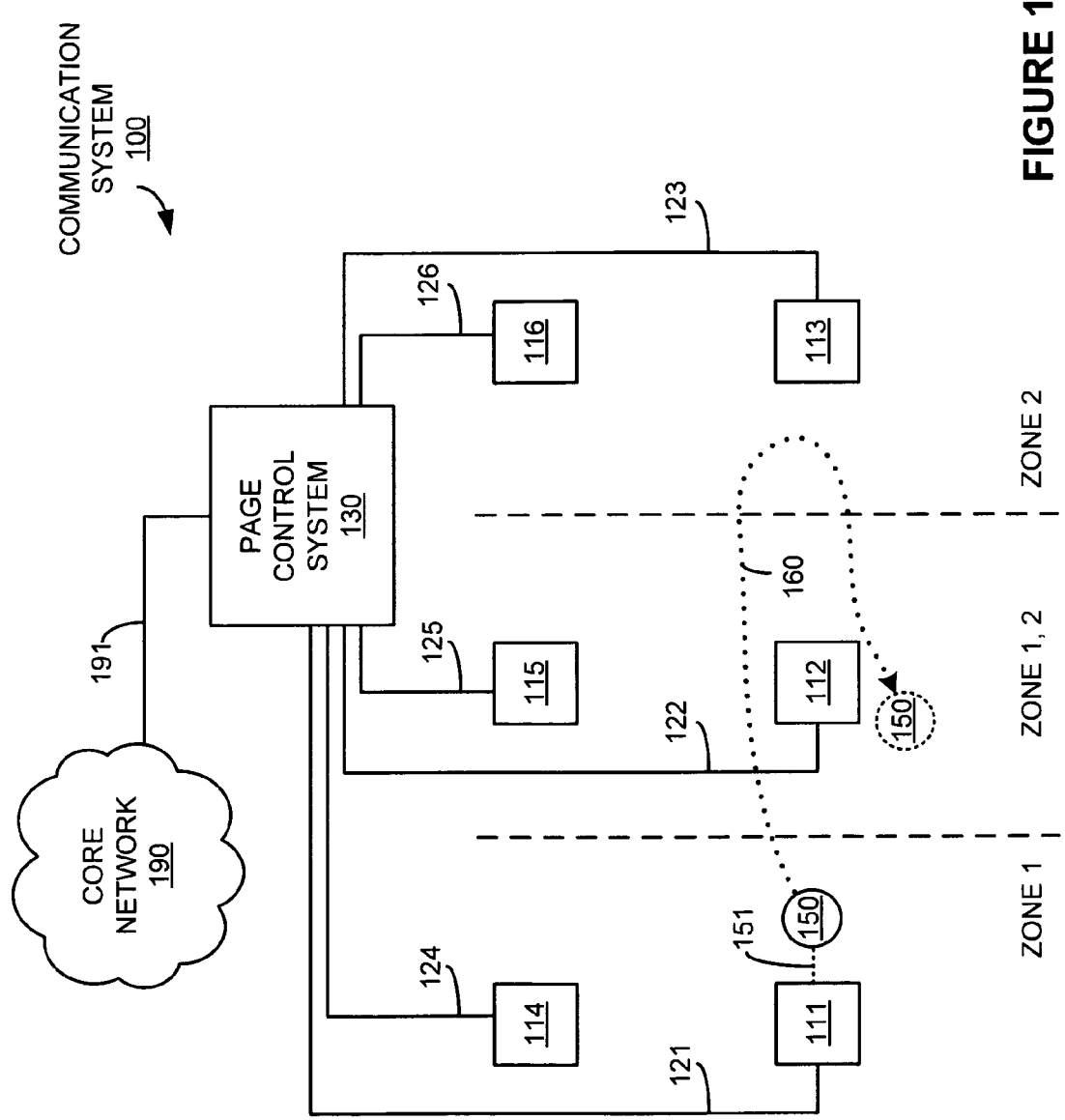
FIG. 1 is a system diagram illustrating a communication system.

FIG. 1 is a system diagram illustrating communication system 100. Communication system 100 includes wireless access nodes 111-116, page control system 130, wireless communication device 150, and core network 190. Wireless access nodes 111-116 each communicate with page control system 130 over links 121-126, respectively. Page control system 130 and core network 190 communicate over link 191. Wireless communication device 150 and wireless access node 111 communicate initially over wireless link 151.

A paging zone identifier (ID) is a number, designator, or other representation which indicates a paging zone into which a wireless access node is grouped. Wireless access nodes can be grouped into different zones for delivery of pages. This grouping can be done to allow a page control system to route a subset of all pages to different zones, thus reducing the amount of total paging traffic across a wireless communication network. In typical examples, many wireless access nodes are included in a paging zone. The paging zones could be determined by a quantity of wireless access nodes per zone, geography, wireless coverage area limitations, or other factors, including combinations thereof. In the example shown in FIG. 1, "zone 1" includes wireless access nodes 111 and 114, while "zone 2" includes wireless access nodes 113 and 116. An intermediate or zone border area, indicated by the label "zone 1, 2" in FIG. 1, includes wireless access nodes 112 and 115. It should be understood that a different configuration or number of wireless access nodes in each zone could be utilized.

In typical examples, information is transferred to wireless communication devices in communication system 100 which indicates incoming calls, messages, or other alerts. This information is typically referred to as pages, and is routed by page control system 130 through wireless access nodes 111-116 for delivery to the wireless communication devices communicating therewith. In further examples, these pages could include voice call alerts, text messages, audio messages, or other information, including combinations thereof. Page control system 130 could receive pages from core network 190, could be generated from within page control system 130, or due to activity of other wireless communication devices or wireless access nodes within communication system 100.

Figure 2:
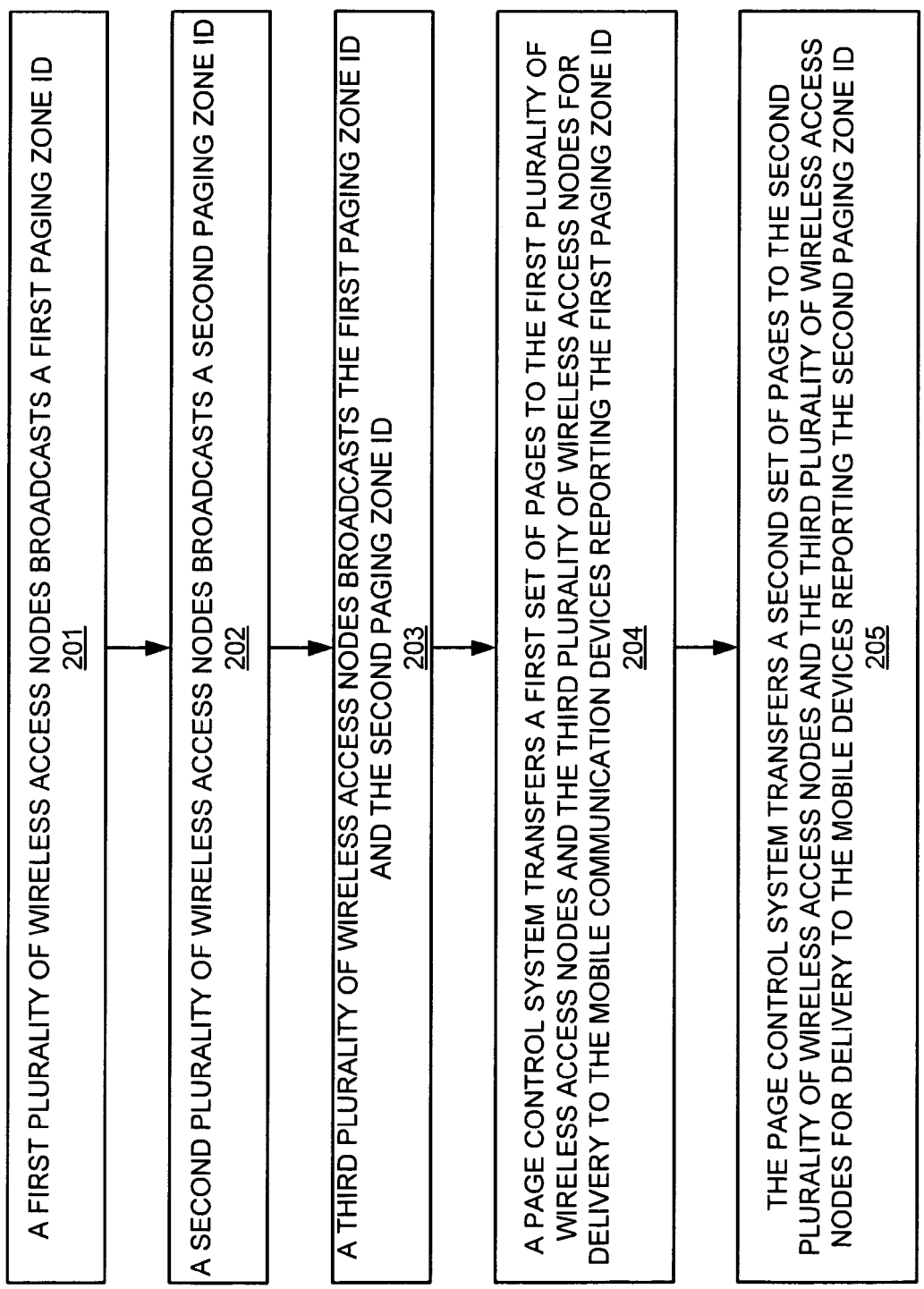
FIG. 2 is a flow diagram illustrating a method of operation of a communication system.

FIG. 2 is a flow diagram illustrating a method of operation of communication system 100, as found in FIG. 1. The operations listed in FIG. 2 are indicated herein parenthetically. In FIG. 2, a first plurality of wireless access nodes broadcasts (201) a first paging zone identifier (ID). In this example, the first plurality of wireless access nodes which broadcast the first paging zone ID includes wireless access nodes 111 and 114. A second plurality of wireless access nodes broadcasts (202) a second paging zone ID. In this example, the second plurality of wireless access nodes which broadcast the second paging zone ID includes wireless access nodes 113 and 116.

A third plurality of wireless access nodes broadcasts (203) the first paging zone ID and the second paging zone ID. In this example, the third plurality of wireless access nodes which broadcast the third paging zone ID includes wireless access nodes 112 and 115. It should be understood that further wireless access nodes could be included in each of the first, second, and third pluralities of wireless access nodes discussed above.

Wireless access nodes 111-116 broadcast the paging zone IDs, which are then received by wireless communication devices when they register for wireless communication service through one of wireless access nodes 111-116. Wireless communication devices may report the paging zone ID to page control system 130 when registering to use one of wireless access nodes 111-116 for communication service. In this example, wireless communication device 150 receives the first paging zone ID from wireless access node 111 when initially registering with wireless access node 111, and reports the paging zone ID to page control system 130.

In the course of operation of communication system 100, pages are received or generated by page control system 130. These pages are then routed for delivery to the appropriate wireless communication devices. Page control system 130 includes a listing of the paging zone IDs for which each wireless communication device registered for communication service with wireless access nodes 111-116 has reported to page control system 130.

Page control system 130 transfers (204) a first set of pages to the first plurality of wireless access nodes and the third plurality of wireless access nodes for delivery to wireless communication devices reporting the first paging zone ID. Page control system 130 transfers (205) a second set of pages to the second plurality of wireless access nodes and the third plurality of wireless access nodes for delivery to the wireless communication devices reporting the second paging zone ID.

Subsequently, the wireless access nodes in each zone each receives the associated pages routed by page control system 130. For example, wireless access node 111 receives pages routed to zone 1, wireless access node 113 receives pages routed to zone 2, and wireless access node 112 receives pages routed to both zones 1 and 2.

In the example shown in FIG. 1, wireless communication device 150 is a mobile communication device which is shown to travel across a zone boundary between zone 1 and zone 2. Initially, wireless communication device 150 is registered for communication service with wireless access node 111, and reports the paging zone ID that is broadcast by wireless access node 111 to paging control system 130. In this case, the first paging zone identifier would be provided to wireless communication device 150, and subsequently reported to page control system 130.

Then, as shown by the dotted line indicating path 160, wireless communication device 150 travels into the coverage area of wireless access node 112. Wireless communication device 150 registers for communication service with wireless access node 112. As noted above, wireless access node 112 broadcasts both the first paging zone ID and the second paging zone ID. Wireless communication device 130 will receive two paging zone IDs. Since wireless communication device 150 has already reported to page control system 130 a paging zone ID which is included in the paging zone IDs broadcast by wireless access node 112, it will not report a new paging zone ID to page control system 130 when registering for communication service with wireless access node 112. In this manner, the paging zone ID for wireless communication device 150 remains unchanged as the first paging zone ID within page control system 130.

Wireless communication device 150 then moves from the coverage area of wireless access node 112 to the coverage area of wireless access node 113. When wireless communication device 150 is in the coverage area of wireless access node 113, wireless communication device 150 registers for communication service with wireless access node 113. As noted above, wireless access node 113 broadcasts the second paging zone ID. Since wireless communication device 150 has reported the first paging zone ID to page control system 130, and wireless access node 113 does not broadcast paging zone IDs which include the currently reported paging zone, then wireless communication device 150 will report the new second paging zone ID to page control system 130.

Next, wireless communication device 150 travels out of the coverage area of wireless access node 113 and back into the coverage area of wireless access node 112. Wireless communication device 150 registers for communication service with wireless access node 112. As noted above, wireless access node 112 broadcasts both the first paging zone ID and the second paging zone ID. Wireless communication device 150 will receive the two paging zone IDs. Since wireless communication device 150 has already reported to page control system 130 a paging zone ID which is included in the paging zone IDs broadcast by wireless access node 112, it will not report a new paging zone ID to page control system 130 when registering for communication service with wireless access node 112. In this manner, the paging zone ID for wireless communication device 150 remains unchanged as the second paging zone ID within page control system 130.

Advantageously, when wireless communication device 150 travels across a border between paging zones 1 and 2 in communication system 100, wireless communication device 150 does not have to constantly report different paging zone IDs to page control system 130. In this example, wireless access node 112 broadcasts a paging zone ID for both paging zones 1 and 2, and subsequently receives pages for both paging zones 1 and 2. Thus, wireless access node 112 can deliver pages to wireless communication device 150 if wireless communication device 150 is registered with page control system 130 for zone 1 or zone 2. In this manner, the amount of traffic accompanying wireless communication device 150 constantly re-reporting a paging zone ID to page control system is greatly reduced. This can be especially advantageous when wireless communication device 150 lies at the border between two paging zones, or travels rapidly between two paging zones.

Referring back to FIG. 1, wireless access nodes 111-116 each includes wireless communications equipment capable of communicating with and providing communication service to wireless communication devices. Examples of wireless access nodes 111-116 include base stations, base transceiver stations, boomer stations, call processing equipment, wireless access points, routers, gateways, as well as other type of communication equipment, including combinations thereof. Wireless access nodes 111-116 could also include computer processing equipment, microprocessors, digital storage equipment, or other processing equipment. Wireless access nodes 111-116 each have a limited geographic range over which they can provide communication services to wireless communication devices. This limited geographic range is referred to as the coverage area. In typical examples, the coverage areas of wireless access nodes 111-116 is determined by geographic features, empirical data, the equipment of wireless access nodes 111-116, or by other factors, including combinations thereof.

Page control system 130 includes network equipment capable of transferring pages for delivery to wireless communication device 150. Examples of page control system 130 include radio node controllers (RNC), mobile switching centers (MSC), call processing equipment, telephone switches, routers, gateways, computer processing equipment, microprocessors, as well as other type of communication and processing equipment, including combinations thereof.

Wireless communication device 150 comprises a wireless telephone, transceiver, computer, digital assistant, smart phone, Internet appliance, or some other wireless communication apparatus, including combinations thereof. Typical examples of wireless communication device 150 are mobile communication devices. Although communication system 100, as shown in FIG. 1, includes one wireless communication device, it should be understood that in other examples, a different number of wireless communication devices could be included. In the example shown in FIG. 1, wireless communication device 150 is a mobile communication device.

Core network 190 includes an Internet network, wireless network, telephony network, optical network, enterprise network, local area network, packet data serving node, or (PDSN), or some other type of communication network or communication equipment, including combinations thereof. In some examples, core network 190 is a core network of a telecommunications provider.

Wireless link 151 uses various communication media, such as air, space, or some other wireless transport media, including combinations thereof. Wireless link 151 could use protocols such as code division multiple access (CDMA), evolution-data optimized (EV-DO), worldwide interoperability for microwave access (WiMAX), long-term evolution (LTE), wireless fidelity (WiFi), global system for mobile communications (GSM), universal mobile telecommunications system (UMTS), high speed packet access (HSPA), or some other communication format, including combinations, variations, or improvements thereof.

Wireless link 151 may include many different signals sharing the same link. Wireless link 151 could include multiple signals operating in a single "airpath"—as represented by the dashed lines in FIG. 1—comprising access channels, forward links, reverse links, beacon signals, user communications, communication sessions, overhead communications, frequencies, timeslots, transportation ports, logical transportation links, network sockets, packets, or communication directions. It should be understood that as wireless communication device 150 travels through coverage areas of other wireless access nodes along path 160, new wireless links are accordingly established and de-established between the other wireless access nodes and wireless communication device 150.

Links 121-126 and 191 each use various communication media, such as air, space, metal, optical fiber, or some other signal propagation path—including combinations thereof. Links 121-126 and 191 could each be wired or wireless and could use communication protocols such as Internet, Internet protocol (IP), local-area network (LAN), optical networking, hybrid fiber coax (HFC), telephony, T1, or some other communication format, including combinations, improvements, or variations thereof. Link 121-126 and 191 could each be a direct link or might include various equipment, intermediate components, systems, and networks. Links 121-126 and 191 could each include multiple signals operating in a single pathway in a similar manner as wireless link 151.

Figure 3:
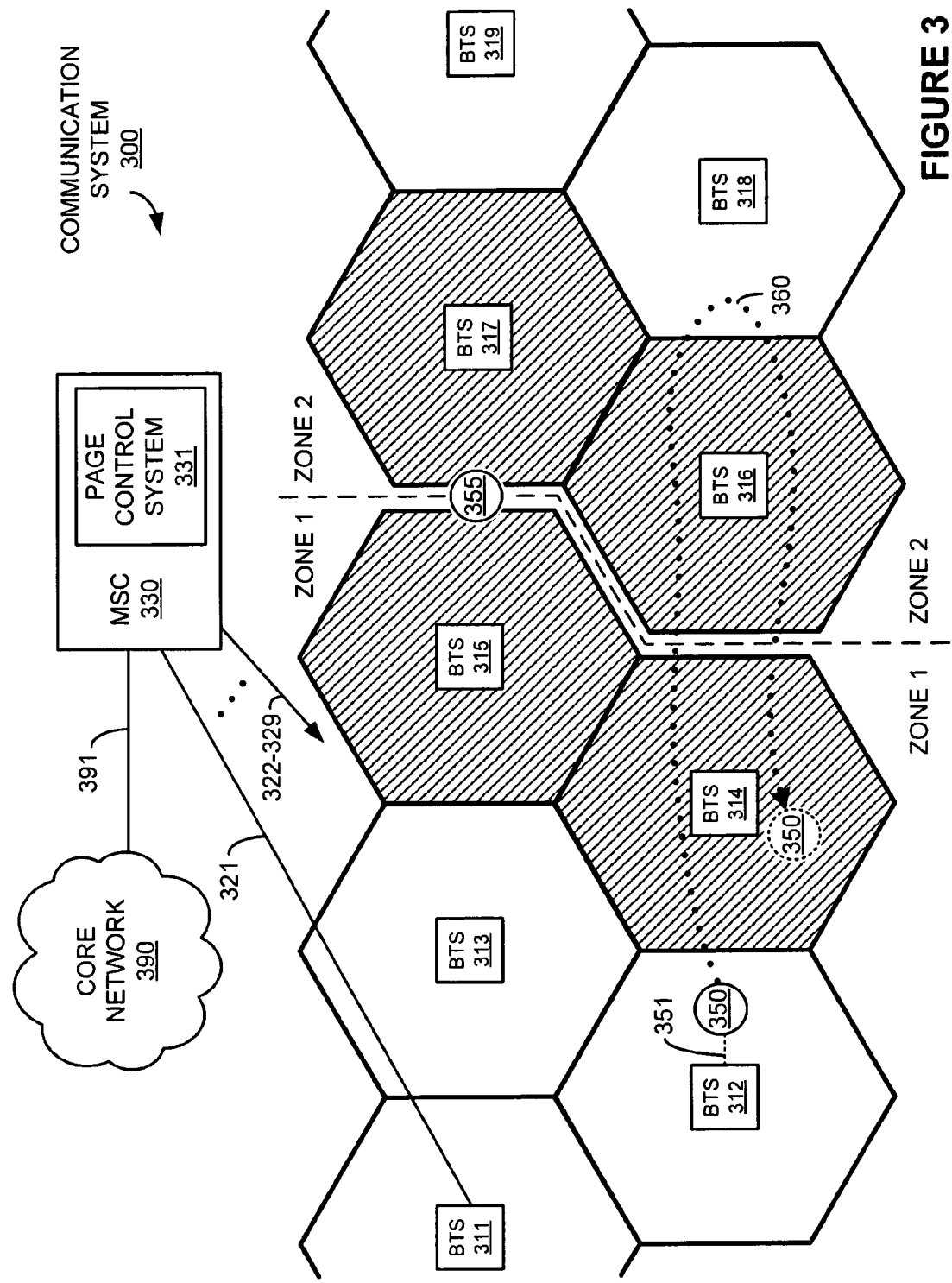
FIG. 3 is a system diagram illustrating a communication system.

FIG. 3 is a system diagram illustrating communication system 300. Communication system 300 includes base transceiver stations (BTS) 311-319, mobile switching center (MSC) 330, wireless communication devices (WCD) 350 and 355, and core network 390. MSC 330 and BTS 311-319 each communicate over links 321-329, respectively. MSC 330 and core network 390 communicate over link 391. WCD 350 and BTS 311 initially communicate over wireless link 351.

Base transceiver stations (BTS) 311-319 each include wireless communications equipment capable of communicating with and providing communication service to wireless communication devices. BTS 311-319 each comprise antennas, transceivers, and other equipment for communicating with and controlling WCD 350 and WCD 355, or other wireless communication devices.

BTS 311-319 each have a limited geographic range over which they can provide communication services to wireless communication devices. The limited range over which each BTS 311-319 can support communications with wireless communication devices is indicated by hexagonal-shaped coverage areas in FIG. 3. Although a hexagonal region defining each coverage area is shown in FIG. 3, it should be understood that the coverage areas could be of other shapes and configurations, as determined by geographic features, empirical data, the equipment BTS 311-319, or by other factors, including combinations thereof.

MSC 330 includes page control system 331. In this example, MSC 330 is a mobile switching center. Page control system 331 includes network equipment capable of generating or transferring pages for delivery to WCD 350. Examples of page control system 331 include call processing equipment, routers, gateways, computer processing equipment, microprocessors, as well as other type of communication and processing equipment, including combinations thereof. Examples of MSC 330 could also include radio node controllers (RNC), further mobile switching centers (MSC), further call processing equipment, telephone switches, routers, gateways, as well as other type of communication and processing equipment, including combinations thereof.

In this example, wireless communication devices (WCD) 350 and 355 each comprise a mobile wireless telephone. Although communication system 300, as shown in FIG. 3, includes two wireless communication devices, it should be understood that in other examples, a different number of wireless communication devices could be included.

WCD 350 traverses path 360, indicated by the dotted line, which crosses the coverage areas of several BTS. In this example, as illustrated by path 360, WCD 350 is initially in the coverage area of wireless access node 312, traverses through the coverage areas of BTS 314, BTS 316, and BTS 318, and finally is located in the coverage area of BTS 314. WCD 355 is shown stationary in this example, on the border between the coverage areas of BTS 315 and BTS 317.

Core network 390, in this example, includes the core network of a telecommunications provider, and provides communication links between other communication networks and further MSCs.

Wireless link 351 uses the code division multiple access (CDMA) protocol in this example. Wireless link 351 may include many different signals sharing the same link as described above for wireless link 151. It should be understood that as WCD 350 travels through coverage areas of other BTS along path 360, new wireless links are accordingly established and de-established between the other BTS and WCD 350. Likewise, although a wireless link is not shown for WCD 355, a wireless link could be established between WCD 355 and either BTS 315 or BTS 317, as discussed below.

Links 321-329 and 391 each are T1 connections capable of transferring IP traffic in this example. Links 321-329 and 391 could each be a direct link or might include various equipment, intermediate components, systems, and networks. Links 321-329 and 391 could each include multiple signals operating in a single pathway in a similar manner as wireless link 151.

Figure 4:
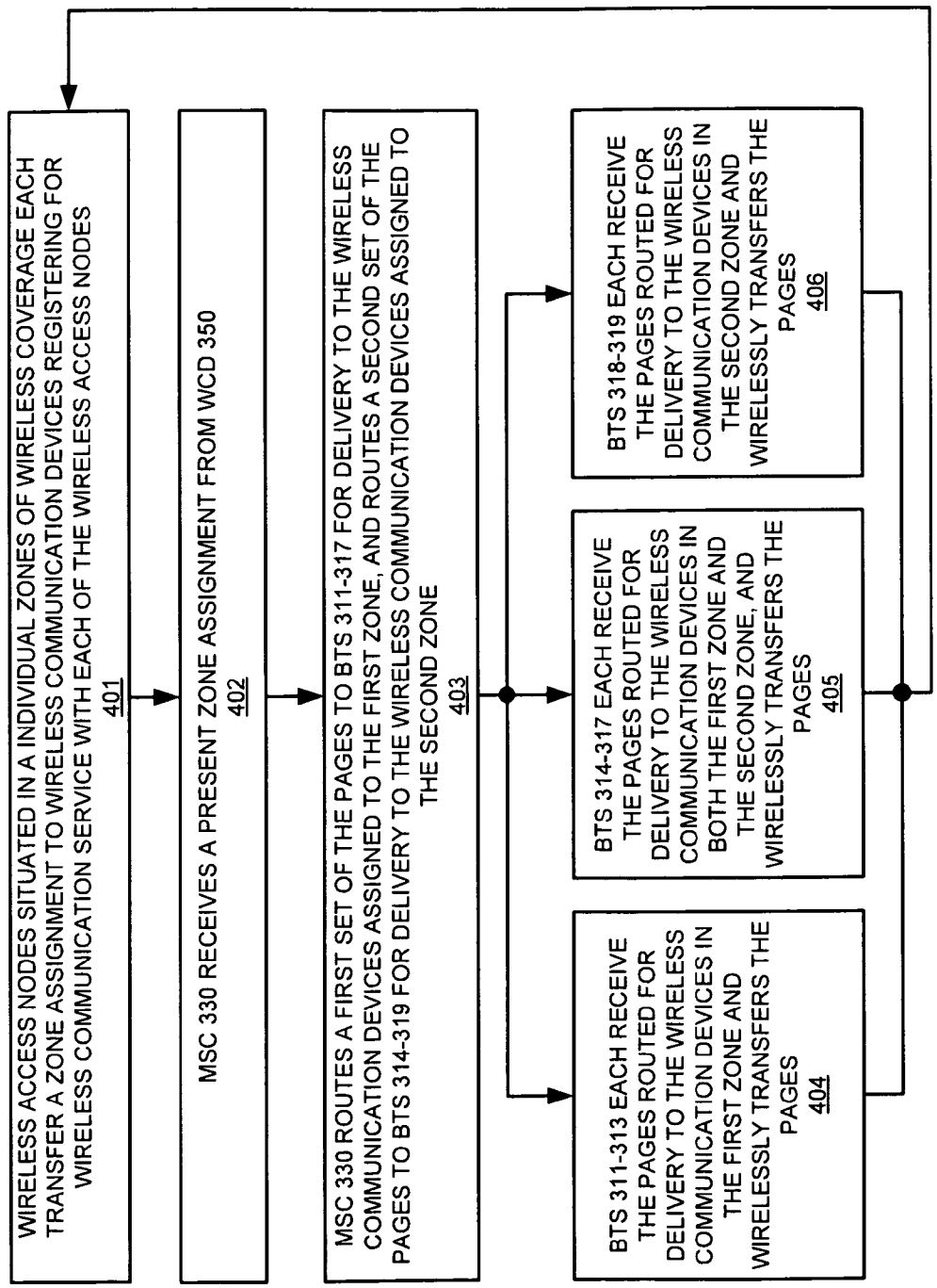
FIG. 4 is a flow diagram illustrating a method of operation of a communication system.

FIG. 4 is a flow diagram illustrating a method of operation of communication system 300, as found in FIG. 3. The operations listed in FIG. 4 are indicated herein parenthetically. In FIG. 4, wireless access nodes situated in individual zones of wireless coverage each transfer (401) a zone assignment to wireless communication devices registering for wireless communication service with each of the wireless access nodes. The zones refer to paging zones in this example. Also in this example, each wireless access node includes a base transceiver station, namely BTS 311-319. Each BTS 311-319 has an individual coverage area associated therewith, as shown by the hexagonal coverage areas in FIG. 3. Additionally, the various base transceiver stations are divided into two paging zones of wireless coverage, namely zone 1 and zone 2, each of which includes several base transceiver stations in each zone.

However, as shown in FIG. 3, BTS 314-317 are located proximate to a paging zone boundary, as indicated by a shaded appearance for clarity. BTS 314-317 each broadcast a paging zone assignment indicating both zone 1 and zone 2. BTS 311-313 each broadcast a paging zone assignment of zone 1, and BTS 318-319 each broadcast a paging zone assignment of zone 2. Thus, as discussed herein, the paging zone assignment could include more than one zone indication. The paging zone assignments of each BTS could be preconfigured in some examples, while in other examples, the paging zone assignments could be received from MSC 330 or core network 390.

In FIG. 3, WCD 350 initially registers for communication service with BTS 312, as illustrated by wireless link 351 in FIG. 3. During the registration process, WCD 350 receives a zone assignment of zone 1, as broadcast by BTS 312 in operation 401. In some examples, WCD 350 then determines if a present zone assignment must be transferred to page control system 331 in MSC 330. Since WCD 350 is initially registering for communication service with BTS 312, such as after a power-on of WCD 350, a present zone assignment would be transferred to page control system 331. WCD 350 could transfer the present zone assignment over a wireless link 351 to BTS 312, then over link 322 to MSC 330.

Page control system 331 in MSC 330 receives (402) a present zone assignment from WCD 350. MSC 330 could receive this present zone assignment over link 322 and wireless link 351 from WCD 350. At this time, the present zone assignment would indicate WCD 350 was associated with paging zone 1, as BTS 312 broadcasts a paging zone assignment of zone 1, as mentioned above. Paging control system 331 could then store the present zone assignment of WCD 350. In some examples, this is done in a computer-readable storage medium of a computer processing system included in page control system 331. In other examples, a digital cache or memory is used to store present zone assignment of wireless communication devices, while in further examples different configurations could be used.

During the course of operation of communication system 300, MSC 330 will receive pages for the various wireless communication devices located throughout the various paging zones in communication 300. MSC 330 could also generate pages based upon the communication activities of wireless communication devices in communication system 300, internal activities or processing of MSC 330, or based upon information received from core network 390, including other sources. MSC 330 routes (403) a first set of the pages to BTS 311-317 for delivery to the wireless communication devices assigned to the zone 1, and routes a second portion of the pages to BTS 314-319 for delivery to the wireless communication devices assigned to zone 2.

BTS 311-313 each receive (404) the pages routed for delivery to the wireless communication devices in zone 1 and wirelessly transfer the pages. BTS 314-317 each receive (405) the pages routed for delivery to the wireless communication devices in both zone 1 and zone 2, and wirelessly transfer the pages. BTS 318-319 each receive (406) the pages routed for delivery to the wireless communication devices in zone 2, and wirelessly transfer the pages. As mentioned, BTS 314-317 each receive and wirelessly transmit the pages for both zone 1 and zone 2.

In the example shown in FIG. 3, wireless communication device 350 is a mobile communication device which is shown to travel across a zone boundary from zone 1 to zone 2. Initially, wireless communication device 350 is registered for communication service with BTS 312, and reports the present paging zone assignment that is broadcast by BTS 312 to paging control system 331. In this case, the present zone assignment of zone 1 would be provided to WCD 350 by BTS 312, and subsequently the present zone assignment would be reported to page control system 331 by WCD 350 communicating though BTS 312.

Then, as shown by the dotted line indicating path 360, WCD 350 travels into the coverage area of BTS 314. WCD 350 registers for communication service with BTS 314. As noted above, BTS 314 broadcasts a paging zone assignment which includes both zone 1 and zone 2. WCD 350 will then receive the paging zone assignment which includes both zone 1 and zone 2. Since WCD 350 has already reported to page control system 331 a present zone assignment which is included in the paging zone assignment broadcast by BTS 314, WCD 350 will not report a new zone assignment to page control system 331 when registering for communication service with BTS 314. In this manner, the present zone assignment for WCD 350 remains unchanged as zone 1 within page control system 331.

Likewise, when WCD 350 travels along path 360 to the coverage area of BTS 316, located with in the area designated as zone 2 in FIG. 3, WCD 350 registers for communication service with BTS 316. As mentioned above, instead of just broadcasting a paging assignment of zone 2, BTS 316 broadcasts a paging zone assignment of both zone 1 and zone 2. Thus, WCD 350 would still receive a paging zone assignment which also includes the previously reported zone assignment of zone 1, and WCD 350 would not report a new paging assignment to page control system 331, even though WCD 350 has crossed a paging zone boundary.

However, for example, if BTS 316 did not broadcast a zone assignment which included zone 1, WCD 350 would then report a new present zone assignment to page control system 331. This can be illustrated when WCD 350 moves along path 360 from the coverage area of BTS 316 to the coverage area of BTS 318. When WCD 350 is in the coverage area of BTS 318, WCD 350 registers for communication service with BTS 318. As noted above, BTS 318 broadcasts a paging assignment of only zone 2. Since WCD 350 has previously reported the a present zone assignment of zone 1 to page control system 331, and BTS 318 does not broadcast a zone assignment which include the currently reported paging zone, then WCD 350 will report zone 2 as a present zone assignment to page control system 331.

In further examples, WCD 350 could always report the received paging zone assignment when registering for communication service with a different BTS, including multiple zones if appropriate, to paging control system 331. Paging control system 331 could then determine if the present zone assignment of WCD 350 must be updated in paging control system 331.

Next, WCD 350 travels out of the coverage area of BTS 318 and back into the coverage area of BTS 316. WCD 350 registers for communication service with BTS 316. As noted above, BTS 316 broadcasts a paging zone assignment which includes both zone 1 and zone 2. WCD 350 will receive the paging zone assignment which includes both zone 1 and zone 2. Since WCD 350 has previously reported to page control system 331 a present zone assignment which is included in the paging zone assignment broadcast by BTS 316, WCD 350 will not report a new paging zone assignment to page control system 331 when registering for communication service with BTS 316. In this manner, the paging zone assignment for WCD 350 remains unchanged as zone 2 within page control system 331.

Finally, WCD 350 travels out of the coverage area of BTS 316 and into the coverage area of BTS 314, which lies across a zone boundary as indicated in FIG. 3. WCD 350 registers for communication service with BTS 314. As noted above, BTS 314 broadcasts a paging zone assignment which includes both zone 1 and zone 2. WCD 350 will receive the paging zone assignment which includes both zone 1 and zone 2. Similarly to the previous movement of WCD 350 from the coverage area of BTS 318 to BTS 316, since WCD 350 has previously reported to page control system 331 a present zone assignment which is included in the paging zone assignment broadcast by BTS 314, WCD 350 will not report a new paging zone assignment to page control system 331 when registering for communication service with BTS 314. In this manner, the paging zone assignment for WCD 350 remains unchanged as zone 2 within page control system 331, even though WCD 350 has crossed a paging zone boundary.

Advantageously, when WCD 350 travels across a zone border between paging zones 1 and 2 in communication system 300, WCD 350 does not have to constantly report different present zone assignments to page control system 331. In this example, BTS 314-317 each broadcasts a paging zone assignment which includes both zone 1 and zone 2, and BTS 314-317 each receives pages from page control system 331 for both paging zones 1 and 2. Thus, BTS 314-317 can deliver pages to WCD 350 if WCD 350 is registered with page control system 331 for zone 1 or zone 2. In this manner, the amount of traffic accompanying WCD 350 reporting paging zone assignments to page control system is greatly reduced. This can be especially advantageous when WCD 350 lies at the border between two paging zones, or travels rapidly between two paging zones. In many examples, the registrations indicating new paging zone assignments occur over access channel portions of a wireless link. Advantageously, due to less traffic due to paging zone assignments on the zone border base transceiver stations, occupancy of access channels wireless links of the zone border base transceiver stations could be reduced, and call set up performance could be enhanced for wireless communication devices.

As a further example, WCD 355 is shown as generally stationary near a zone boundary in FIG. 3. However, due to changing conditions, the coverage areas of BTS 315 and BTS 317 could fluctuate in size, shape, signal strength, noise levels, or other factors, including combinations thereof. If, for example, WCD 355 was initially registered for communication service with BTS 315, a present zone assignment of zone 1 could be reported to page control system 331 by WCD 355.

Due to changing conditions, the effective coverage area of BTS 315 could shrink, making it more advantageous for WCD 350 to establish communication service through BTS 317. Likewise, the signal strength of BTS 317 as detected by WCD 350 could be stronger, making it more advantageous for WCD 350 to establish communication service through BTS 317. Other scenarios could also enable a situation where stationary WCD 355 would desire to register for communication service with BTS 317 when initially registered for communication service with BTS 315; these examples are not intended to limit the possible scenarios.

WCD 355 then registers for communication service with BTS 317. As noted above, BTS 317 broadcasts a paging zone assignment of both zone 1 and zone 2. WCD 355 will receive the paging zone assignment which includes both zone 1 and zone 2. Since WCD 355 has previously reported to page control system 331 a present zone assignment which is included in the paging zone assignment broadcast by BTS 317, WCD 355 will not report a new paging zone assignment to page control system 331 when registering for communication service with BTS 317. In this manner, the paging zone assignment for WCD 355 remains unchanged as zone 1 within page control system 331.

Additionally, a subsequent change in the present conditions of the coverage areas of BTS 315 or BTS 317 could make it favorable for WCD 355 to register again with BTS 315. As noted above, BTS 315 broadcasts a paging zone assignment of both zone 1 and zone 2. WCD 355 will receive the paging zone assignment which includes both zone 1 and zone 2. Since WCD 355 has previously reported to page control system 331 a present zone assignment which is included in the paging zone assignment broadcast by BTS 315, WCD 355 will not report a new paging zone assignment to page control system 331 when registering for communication service with BTS 315. In this manner, the paging zone assignment for WCD 355 remains unchanged as zone 1 within page control system 331. Advantageously, as the effective coverage areas or other factors of BTS 315 and BTS 317 fluctuate, WCD 355 can register for communication service repeatedly between the two base transceiver stations without reporting a new present zone assignment to page control system 331.

It should be understood that the initial zone assignment reported by WCD 355 to page control system 331 could be either zone 1 or zone 2. The procedure detailed herein is not affected by the initially-reported zone assignment in the example of WCD 355.

In further examples, the hexagonal coverage areas of each BTS 311-319 could be further subdivided into sectors. A sector can represent a particular region of wireless coverage, typically served by a single antenna, antenna array, or base transceiver station of an access node. Further base transceiver station equipment could be included in BTS 311-319 in examples where sectors are employed. In many examples, there are multiple sectors associated with a single wireless access node, antenna tower, or base station, with each sector describing a slice of the surrounding geographic region serviced by the wireless access node. For example, the coverage areas of each BTS 311-319 could be subdivided into three sectors. Each sector could broadcast a paging zone assignment. The sectors which serve a coverage area proximate to the border between zone 1 and zone 2 could broadcast a paging zone assignment of both zone 1 and zone 2, similar to as discussed in the previous examples where each BTS has only one associated sector. Likewise, the sectors serving a coverage area not proximate to the border between zone 1 and zone 2 could broadcast a paging zone assignment of only a single zone.

FIGS. 1-4 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication system that serves mobile communication devices, the method comprising:
   in a first plurality of wireless access nodes, broadcasting a first paging zone identifier (ID), wherein the mobile communication devices report the first paging zone ID to a page control system when registering to use one of the first plurality of wireless access nodes;
   in a second plurality of wireless access nodes, broadcasting a second paging zone identifier (ID), wherein the mobile communication devices report the second paging zone ID to the page control system when registering to use one of the second plurality of wireless access nodes;
   in a third plurality of wireless access nodes, broadcasting multiple paging zone identifiers comprising the first paging zone ID and the second paging zone ID, wherein the mobile communication devices each evaluate an associated present paging zone ID against the multiple paging zone identifiers to determine if the associated present paging zone ID is included in the multiple paging zone identifiers, wherein ones of the mobile communication devices do not report to the to the page control system when registering to use one of the third plurality of wireless access nodes if the associated present paging zone ID is included in the multiple paging zone identifiers; and
   in the page control system, transferring a first set of pages to the first plurality of wireless access nodes and the third plurality of wireless access nodes for delivery to the mobile communication devices reporting the first paging zone ID, and transferring a second set of pages to the second plurality of wireless access nodes and the third plurality of wireless access nodes for delivery to the mobile devices reporting the second paging zone ID.

2. The method of claim 1, wherein the first plurality of wireless access nodes are located in a first paging zone corresponding to the first paging zone ID, the second plurality of wireless access nodes are located in second paging zone corresponding to the second paging zone ID, and the third plurality of wireless access nodes are located proximate to a boundary between the first paging zone and the second paging zone.

3. The method of claim 1, wherein the mobile communication devices report the first paging zone ID to the page control system when registering to use one of the third plurality of wireless access nodes if not currently using either the first paging zone ID or the second paging zone ID.

4. The method of claim 1, wherein the mobile communication devices report the second paging zone ID to the page control system when registering to use one of the third plurality of wireless access nodes if not currently using either the first paging zone ID or the second paging zone ID.

5. The method of claim 1, further comprising:
   in the first plurality of wireless access nodes and third plurality of wireless access nodes, receiving the first set of pages from the page control system and transferring the first set of pages to the mobile communication devices reporting the first paging zone ID.

6. The method of claim 1, further comprising:
in the second plurality of wireless access nodes and third plurality of wireless access nodes, receiving the second set of pages from the page control system and transferring the second set of pages to the mobile communication devices reporting the second paging zone ID.

7. The method of claim 1, wherein the mobile communication devices comprise wireless telephones.

8. The method of claim 1, wherein a portion of the first set of pages and the second set of pages comprise voice call alerts.

9. The method of claim 1, wherein a portion of the first set of pages and the second set of pages comprise text messages.

10. The method of claim 1, wherein a portion of the first set of pages and the second set of pages comprise audio messages.

11. A method of operating a wireless communication system, wherein a page control system is configured to route pages to wireless access nodes for delivery to wireless communication devices, and wherein the wireless access nodes are partitioned into zones of wireless coverage, the method comprising:
in a first wireless access node situated in a first zone of wireless coverage, transferring a first zone identifier (ID) to wireless communication devices registering for wireless communication service with the first wireless access node, wherein the first zone ID indicates the first zone of wireless coverage;
in a second wireless access node situated in a second zone of wireless coverage, transferring a second zone ID to wireless communication devices registering for wireless communication service with the second wireless access node, wherein the second zone ID indicates the second zone of wireless coverage;
in a third wireless access node situated in the first zone of wireless coverage, transferring multiple paging zone identifiers comprising the first zone ID and the second zone ID to wireless communication devices registering for wireless communication service with the third wireless access node;
in each of the wireless communication devices registering for wireless communication service from the third wireless access node, evaluating an associated present zone assignment against the multiple paging zone identifiers to determine if the associated present zone assignment is included in the multiple paging zone identifiers, wherein the wireless communication devices registering for wireless communication service from the third wireless access node do not report to the to the page control system when registering to use the third wireless access node if the associated present zone assignment is included in the multiple paging zone identifiers;
in the page control system, receiving the present zone assignment from a first of the wireless communication devices, wherein the present zone assignment indicates the first zone when the first of the wireless communication devices is initially registered for wireless communication service with the first wireless access node and subsequently registers for wireless communication service with the third wireless access node.

12. The method of claim 11, further comprising:
in the page control system, routing a first set of the pages to the first wireless access node and the third wireless access node for delivery to the wireless communication devices assigned to the first zone, and routing a second set of the pages to the second wireless access node and the third wireless access node for delivery to the wireless communication devices assigned to the second zone.

13. The method of claim 12, further comprising:
in the first wireless access node, receiving the pages routed for delivery to the wireless communication devices in the first zone and, wirelessly transferring the pages to the wireless communication devices receiving wireless communication service through the first wireless access node;
in the second wireless access node, receiving the pages routed for delivery to the wireless communication devices in the second zone, and wirelessly transferring the pages to the wireless communication devices receiving wireless communication service through the second wireless access node;
in the third wireless access node, receiving the pages routed for delivery to the wireless communication devices in both the first zone and the second zone, and wirelessly transferring the pages to the wireless communication devices receiving wireless communication service through the third wireless access node.

14. The method of claim 11, further comprising:
in a fourth wireless access node situated in the second zone of wireless coverage, transferring the multiple paging zone identifiers comprising the first zone ID and the second zone ID to wireless communication devices registering for wireless communication service with the fourth wireless access node; and
in the page control system, receiving another present zone assignment from a second of the wireless communication devices, wherein the other present zone assignment indicates the second zone when the second of the wireless communication devices is initially registered for wireless communication service with the second wireless access node and subsequently registers for wireless communication service with the fourth wireless access node.

15. The method of claim 11, wherein the pages comprise voice call alerts.

16. A communication system wherein a page control system is configured to route pages to wireless access nodes for delivery to wireless communication devices, and wherein the wireless access nodes are partitioned into zones of wireless coverage, comprising:
a first wireless access node situated in a first zone of wireless coverage configured to transfer a first zone identifier (ID) to the wireless communication devices registering for wireless communication service with the first wireless access node, wherein the first zone ID indicates the first zone of wireless coverage;
a second wireless access node situated in a second zone of wireless coverage configured to transfer a second zone ID to wireless communication devices registering for wireless communication service with the second wireless access node, wherein the second zone ID indicates the second zone of wireless coverage;
a third wireless access node situated in the first zone of wireless coverage configured to transfer multiple paging zone identifiers comprising the first zone ID and the second zone ID to wireless communication devices registering for wireless communication service with the third wireless access node;
each of the wireless communication devices registering for wireless communication service from the third wireless access node configured to evaluate an associated present zone assignment against the multiple paging zone identifiers to determine if the associated present zone assignment is included in the multiple paging zone identifiers, wherein the wireless communication devices registering for wireless communication service from the third wireless access node are configured to not report to the to the page control system when registering to use the third wireless access node if the associated present zone assignment is included in the multiple paging zone identifiers;

the page control system configured to receive the present zone assignment from a first of the wireless communication devices, wherein the present zone assignment indicates the first zone when the first of the wireless communication devices is initially registered for wireless communication service with the first wireless access node and subsequently registers for wireless communication service with the third wireless access node.

17. The communication system of claim 16, comprising:
the page control system configured to route a first set of the pages to the first wireless access node and the third wireless access node for delivery to the wireless communication devices assigned to the first zone, and route a second set of the pages to the second wireless access node and the third wireless access node for delivery to the wireless communication devices assigned to the second zone.

18. The communication system of claim 17, comprising:
the first wireless access node configured to receive the pages routed for delivery to the wireless communication devices in the first zone and, wirelessly transfer the pages to the wireless communication devices receiving wireless communication service through the first wireless access node;

the second wireless access node configured to receive the pages routed for delivery to the wireless communication devices in the second zone, and wirelessly transfer the pages to the wireless communication devices receiving wireless communication service through the second wireless access node;

the third wireless access node configured to receive the pages routed for delivery to the wireless communication devices in both the first zone and the second zone, and wirelessly transfer the pages to the wireless communication devices receiving wireless communication service through the third wireless access node.

19. The communication system of claim 16, further comprising:
a fourth wireless access node in the second zone of wireless coverage configured to transfer the multiple paging zone identifiers comprising the first zone ID and the second zone ID to wireless communication devices registering for wireless communication service with the fourth wireless access node; and the page control system configured to receive another present zone assignment from a second of the wireless communication devices, wherein the other present zone assignment indicates the second zone when the second of the wireless communication devices is initially registered for wireless communication service with the second wireless access node and subsequently registers for wireless communication service with the fourth wireless access node.

20. The method of claim 16, wherein the pages comprise voice call alerts.

\* \* \* \* \*